Sept. 20, 1955  M. P. TAYLOR  2,718,390
PRESSURE SEAL RELIEF MEANS
Filed Nov. 30, 1951
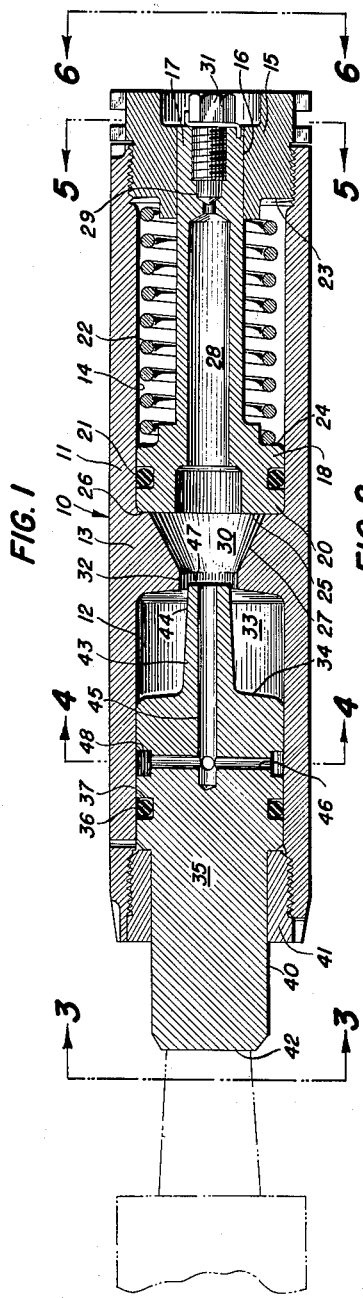
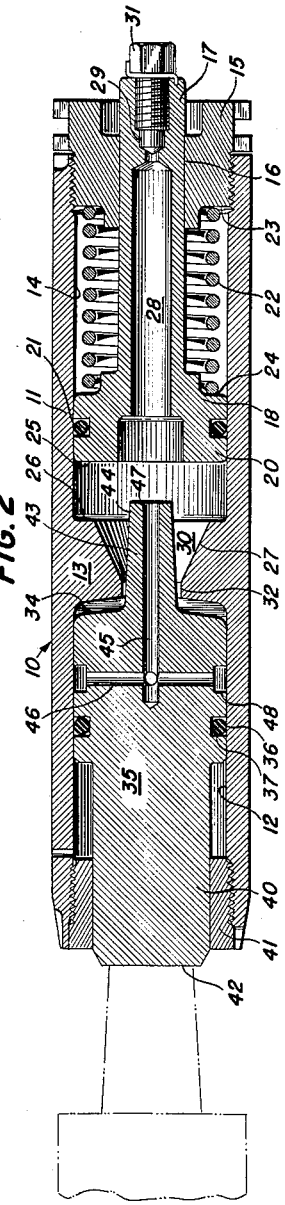
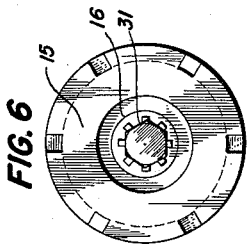
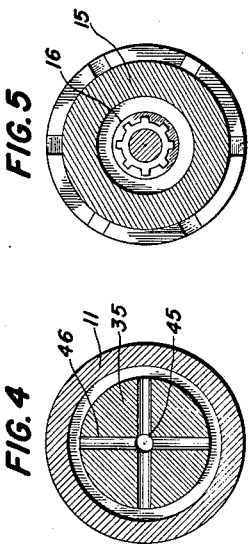
INVENTOR
*MORRIS P. TAYLOR*
ATTORNEY United States Patent Office 2,718,390
Patented Sept. 20, 1955

2,718,390

PRESSURE SEAL RELIEF MEANS

Morris P. Taylor, Palo Alto, Calif., assignor, by mesne assignments, to the United States of America, as represented by the Secretary of the Navy Application November 30, 1951, Serial No. 259,191

3 Claims. (Cl. 267—34)

This invention relates to improvements in pressure seal relief means, and more particularly to means for protecting the sealing rings of hydraulic actuators, buffers, and the like, from the deteriorating effects of wear and abrasion, particularly when such devices are operated at relatively high fluid pressures.

In the operation of hydraulic actuators, buffing devices, and the like, it has frequently been the practice heretofore to effect a substantially fluid-tight seal with the interior surface of a cylindrical member by means of a resilient O-ring seal or similar sealing member composed of a suitable packing material embedded within and carried by the reciprocating piston. However, the utilization of very high fluid pressures in the operation of such devices has interposed problems which have tended to limit the use which has heretofore been made of such seals. For example, the continued exposure of such seals to the action of high fluid pressures often tends to cause an abrasive action which necessitates frequent inspection and replacement of the seals, and sometimes causes a sufficient permanent dislocation of the sealing members to produce excessive fluid leakage or to otherwise substantially interfere with the normal functioning of the device.

It is an important object of the present invention, therefore, to substantially reduce abrasion and wear on the friction surfaces on high pressure seals of the resilient ring type.

It is also an object of this invention to provide a means for relieving pressure seals of the resilient type from the relatively rapid deteriorating effects of high fluid pressures.

It is another object of the invention to provide a pressure relief means which is operable to prevent permanent set and distortion of the sealing members of hydraulic pistons when such pistons are repeatedly subjected to relatively high fluid pressures.

It is a further object of the present invention to provide a pressure relief means adapted to minimize the tendency of resilient sealing materials to be displaced by the action of high pressure fluid in such a manner as to subject the sealing materials to excessive wear.

It is another object of the invention to provide a pressure relief means for hydraulic cylinders and the like which permit such cylinders to be operated at high fluid pressures without causing excessive leakage past the resilient sealing surfaces of a reciprocating piston.

It is also an object of the invention to provide a means for reducing the unit fluid pressure acting on the resilient sealing surfaces of a high pressure hydraulic piston in such a manner as to substantially reduce abrasion of the sealing surfaces.

Further objects are to provide a construction of maximum simplicity, economy and ease of assembly and disassembly, also such further objects, advantages and capabilities as will fully appear and as are inherently possessed by the device and the invention described herein.

With these and other objects in view, as will hereinafter more fully appear, and which will be more particularly pointed out in the appended claims, reference is now made to the following description taken in connection with the accompanying drawings in which:

Figure 1 is a longitudinal sectional view of a hydraulic buffer incorporating the present invention and showing the plunger in its outwardly extending position.

Figure 2 is a longitudinal sectional view of the device of Figure 1 showing the plunger in its fully retracted position.

Figure 3 is an end view of the device taken on the line 3—3 of Figure 1 and looking in the direction of the arrows.

Figure 4 is a transverse sectional view of the pressure relief means taken along the line 4—4 of Figure 1 and looking in the direction of the arrows.

Figure 5 is a transverse sectional view taken along the line 5—5 of Figure 1 and looking in the direction of the arrows.

Figure 6 is an end view of the device from the line 6—6 of Figure 1 and looking in the direction of the arrows.

Referring more particularly to the drawings in which like reference numerals indicate like parts in the several views, there is shown generally at 10 a hydraulic buffing device of a type which is adapted to be operated at relatively high fluid pressures. Buffer 10 is formed by a tubular housing 11 having a bore 12 extending inwardly from one end thereof so that the bottom of bore 12 is separated by the centrally disposed annular baffle 13 from a bore 14 disposed longitudinally along the axis of the housing 11 and extending inwardly from the opposite end thereof. Bore 14 is tapped at its outer end so as to threadedly engage with a plug 15 having a centrally disposed longitudinally extending hole 16 therein which is adapted to receive and support for free sliding movement the outer end 17 of an axially disposed hollow plunger 18. This plunger 18 is closed at its outer end by a needle valve 29 and carries at its inner end a piston 20 which is freely slidable along the bore 14, but is retained in substantially fluid-tight sealing engagement with the inner cylindrical surface of bore 14 by the resilient O-ring 21. A compression spring 22, disposed longitudinally along the axis of the bore 14 and within the housing 11, presses outwardly against a recessed surface 23 in the inner end of plug 15 and inwardly against the outer surface 24 of piston 20 so as to resiliently urge the inner surface 25 thereof into contact with the co-acting surface 26 of the annular baffle 13. Thus, the tapered orifice 27 in baffle 13 and the hollow bore 28 in the plunger 18 form a low pressure reservoir 30 which can readily be filled with hydraulic fluid by removing the screw 31 from the outer end of shaft 18.

Tapered orifice 27 also communicates through a cylindrical orifice or recess 32 in baffle 13 with a high pressure reservoir 33 which is bounded by the inner surfaces 34 of the buffer piston 35 and the bottom and inner cylindrical surfaces of bore 12. Piston 35 is freely slidable along the bore 12 and is retained in substantially fluid-tight engagement with the inner cylindrical surfaces thereof by a suitable resilient sealing member 36, such as an O-ring seal composed of a suitable natural or artificial rubber compound. Preferably, sealing member 36 is supported by an annular recess 37, having a depth slightly less than the diameter of ring 36, which is machined around the periphery of piston 35. Piston 35 has extended outwardly therefrom a short shaft portion 40 of reduced diameter which is supported for free sliding movement along the axis of bore 12 by a sleeve 41 adapted to be screwed into and supported by the outer end of bore 12. Shaft 40 carries at its outer end a button 42 adapted to be depressed by suitable linkage members operated by the associated buffer actuating mechanism.

Inner surface 34 of buffer piston 35 carries an inwardly extending tapered orifice rod 43 having its axis substantially in alignment with the axis of the coacting recess 32 in the annular baffle 13, and orifice rod 43 is adapted to project inwardly through the recess 32, the tapered orifice 27 and into the bore 14 whenever the buffer piston 35 is in the retracted position illustrated in Figure 2. Orifice rod 43 has an inwardly extending longitudinal bore 45 therein which communicates with a pair of transverse bores 46 extending diametrically through piston 35 and communicating at their outer extremities with annular recess 48 circumscribing the periphery of piston 35 in a position between seal 36 and the inner surface 34 of the piston.

In operation, filling screw 31 is removed and the hydraulic buffer 10 is filled with oil or other suitable hydraulic fluid so that the inner chamber 28 in plunger 18, tapered orifice 27, and the high pressure reservoir 33 are completely filled with hydraulic fluid when the buffer piston 35 is in its fully extended position, shown in Figure 1, and the surface 25 of piston 20 is pressed against surface 26 by the resilient action of spring 22. Screw 31 is then inserted into the outer end of 17 of shaft 18 in such a manner as to close the needle valve 29 in the outer end of inner chamber 28.

At the beginning of the buffing stroke, button 42 is depressed by its associated actuating mechanism, thereby compressing the fluid in the high pressure reservoir 33, and retracting buffer piston 35 in such a manner as to move the tapered outer surfaces 44 of the orifice rod 43 into closer proximity with the adjacent inner cylindrical surfaces of the recess 32. In this manner, the transfer of hydraulic fluid from the high pressure reservoir 33 to the low pressure reservoir 30, which is formed by the tapered orifice 27 and the inner chamber 28, is restricted in an increasing manner as the buffing action continues, and with the result that a relatively large amount of kinetic energy is absorbed by the device 10. As fluid is transferred from high pressure reservoir 33 to low pressure reservoir 30 during the buffing stroke, surface 25 of piston 20 is moved away from surface 26 and spring 22 is compressed as plunger 18 moves outwardly with piston 20.

The fluid pressures developed in the high pressure reservoir 33 during the buffing stroke are sufficiently high to cause excessive wear and abrasion of the O-ring seal 36, unless means are provided to protect seal 36 from the damaging and deteriorating effects of continued exposure to the action of such high pressure fluids. Fluid leaking past the outer cylindrical surface of buffer piston 35 during the buffing stroke collects and accumulates in the annular recess 48 before reaching the seal 36, and the high pressure fluid in recess 48 flows through transverse passageways 46 and longitudinal passageway 45 to the end 47 of the tapered orifice rod 43 so that such fluid is discharged directly into the low pressure reservoir 30. Thus, such high pressure leakage fluid is by-passed away from the O-ring seal 36 in such a manner that such seals may be utilized in high pressure buffers, actuators, and similar hydraulic equipment without frequent inspection and replacement of the resilient sealing elements.

At the end of the buffing stroke, orifice rod 43 extends through the tapered orifice 27 and into the inner end of bore 14, the piston 20 having moved outwardly against spring 22. As soon as the operating load is removed from the contact button 42, the resilient action of spring 22 moves surface 25 of piston 20 back into contact with surface 26 and causes hydraulic fluid to move through the orifice 27 from low pressure reservoir 30 to high pressure reservoir 33, thereby returning piston 35 to the extended position illustrated in Figure 1.

Obviously many modifications and variations of the present invention are possible in the light of the above teachings. It is therefore to be understood that the invention may be practiced otherwise than as specifically described.

What is claimed is:

1. A hydraulic buffing device comprising a cylinder, an annular baffle member in said cylinder, said cylinder having a high pressure fluid reservoir on one side of said baffle member, a piston slidable in said cylinder on the other side of said baffle member, said piston containing a chamber facing said baffle member and forming a low pressure fluid reservoir, resilient means urging said piston toward said baffle member, said baffle member having an orifice connecting said reservoirs, a second piston slideable in said cylinder on the high pressure side of said baffle, said second piston having an axial load receiving shaft at one end projecting outwardly of the cylinder and an axially disposed inwardly projecting tapered rod at its opposite end provided with a longitudinal bore therein, said rod being tapered inwardly towards the free end thereof and projecting inwardly toward said orifice and adapted to be moved thereinto and partially therethrough and cooperate therewith to restrict the flow of the fluid from said high pressure reservoir to said low pressure reservoir to a degree varying with the inward displacement of said second piston, a resilient seal circumscribing the periphery of said second piston and adapted to effect a substantially fluid-tight seal with the coacting surface of the cylinder, and means carried by said second piston inwardly of said seal operable to by-pass to the low pressure reservoir a substantial portion of the said high pressure fluid leaking past the piston, said means comprising an annular recess circumscribing the periphery of the second piston and a radially extending bore in said second piston communicating said annular recess with said longitudinal bore.

2. A hydraulic buffing device comprising a compartmented housing defining a high pressure reservoir and a low pressure reservoir, an annular baffle located medially and integrally with the inner surface of said housing and separating the high pressure reservoir from the low pressure reservoir and having an axial orifice of gradually decreasing diameter toward the high pressure reservoir, a first piston having a lower shaft portion and an upper tapered orifice rod portion reciprocatively and slideably engaged to the high pressure reservoir housing, a circumferential groove in said first piston and a pressure seal fitted therein in fluid-tight relation with said high pressure reservoir housing, an annular recess in said first piston located between the upper tapered orifice rod portion and said pressure seal and communicating through transverse bores with a longitudinal axial bore of said orifice rod to by-pass fluid from said high pressure reservoir to said low pressure reservoir, a sleeve removably attached to the lower end of said housing and having an axial bore to guide the lower shaft portion of said first piston therethrough, a high pressure fluid chamber of variable volume bounded by the high pressure reservoir housing and the upper orifice rod surface of said first piston, a low pressure reservoir second piston being axially counterbored therethrough integrally connected to an upper bored shaft which bore is axially aligned with the bore of said second piston, said baffle orifice, and the bore of said tapered orifice rod, and a plug removably attached to the upper end of the housing and axially counterbored to slideably receive said shaft, a compression coil spring surrounding said shaft and biased by the inner housing plug surface at one end and the second piston at the other end to urge said second piston against said baffle, a screw closing the uppermost end of said shaft for filling the buffer system with fluid, said tapered orifice rod coacting with said baffle orifice to gradually decrease the size of the orifice between the high and low pressure reservoirs as the device is compressed.

3. A hydraulic buffing device comprising a baffle divided cylinder having a high pressure reservoir and a low pressure reservoir on opposite sides of the baffle, said baffle being provided with an axially located orifice communicating said reservoirs with each other, a piston slideably mounted within said low pressure reservoir and resilient means to bias said piston against said baffle, a second piston having an annular recess and being slideably engaged with said high pressure reservoir and having a tapered orifice rod with a longitudinal bore providing communication through said baffle orifice between said low pressure reservoir and transverse piston bores to said annular piston recess, and a shaft portion on said second piston for receiving a force on the button thereof to urge said piston orifice rod into cooperation with said baffle orifice to increase fluid pressure between said reservoirs.

References Cited in the file of this patent

UNITED STATES PATENTS

| | | |
|---|---|---|
| 424,448 | Anderson | Apr. 1, 1890 |
| 664,089 | Krone | Dec. 18, 1900 |
| 1,351,141 | Thompson | Aug. 31, 1920 |
| 2,370,942 | Dick | Mar. 6, 1945 |
| 2,469,275 | Rossman | May 3, 1949 |
| 2,483,517 | Balogh | Oct. 4, 1949 |